(12) United States Patent
Sanchez et al.

(10) Patent No.: US 11,354,440 B1
(45) Date of Patent: Jun. 7, 2022

(54) ANALYZING AND MITIGATING PRIVACY ISSUES ON A COMPUTING DEVICE USING COOKIE GENERATION FLOWS

(71) Applicant: SYMANTEC CORPORATION, Mountain View, CA (US)

(72) Inventors: Iskander Sanchez, Antibes (FR); Leylya Yumer, Antibes (FR)

(73) Assignee: NORTONLIFELOCK INC., Tempe, AZ (US)

(*) Notice: Subject to any disclaimer, the term of this patent is extended or adjusted under 35 U.S.C. 154(b) by 341 days.

(21) Appl. No.: 16/449,116

(22) Filed: Jun. 21, 2019

(51) Int. Cl.
- *G06F 21/62* (2013.01)
- *G06F 11/36* (2006.01)
- *G06F 21/52* (2013.01)

(52) U.S. Cl.
CPC ...... *G06F 21/6263* (2013.01); *G06F 11/3636* (2013.01); *G06F 21/52* (2013.01)

(58) Field of Classification Search
CPC ... G06F 21/6263; G06F 23/52; G06F 11/3636
See application file for complete search history.

(56) References Cited

U.S. PATENT DOCUMENTS

| | | | | |
|---|---|---|---|---|
| 2012/0030518 A1* | 2/2012 | Rajwar | ............... | G06F 9/528 |
| | | | | 714/38.13 |
| 2017/0243028 A1* | 8/2017 | LaFever | ............... | G06F 21/6263 |
| 2018/0332132 A1* | 11/2018 | Sampath | ............... | H04L 67/02 |
| 2019/0387055 A1* | 12/2019 | Varvello | ............... | H04L 41/5012 |

OTHER PUBLICATIONS

Github, Inc.; "Chrome DevTools Protocol Viewer"; Webpage; 2019; located at: https://chromedevtools.github.io/devtools-protocol/; 2 pages.
chromium.org; "The Chromium Projects"; Webpage; located at: https://www.chromium.org/; 1 page.
UBlock, LLC; "The Fastest, Most-Powerful Ad Blocker. Block Ads, Pop Ups and Trackers, Browse Faster."; Webpage; 2018; located at https://www.ublock.org/; 1 page.
Cliqz International GmbH; "GHOSTERY: Faster, Safer and Smarter Browsing"; Webpage; located at: https://www.ghostery.com/; 1 page.
Electronic Frontier Foundation; "Privacy Badger"; Webpage; 2019; located at: https://www.eff.org/privacybadger; 1 page.

* cited by examiner

*Primary Examiner* — Ashokkumar B Patel
*Assistant Examiner* — William B Jones
(74) *Attorney, Agent, or Firm* — Maschoff Brennan

(57) ABSTRACT

Analyzing and mitigating privacy issues on a computing device using cookie generation flows. The method includes initiating a headless web browser, monitoring a request made of a website accessed by the headless web browser, monitoring scripts created on the website, instrumenting a function used to create a cookie on the computing device, tracing an initial generation of a call used to create the cookie on the computing device, obtaining a cookie generation flow related to the creation of the cookie, and initiating a security action based on obtaining the cookie generation flow.

20 Claims, 4 Drawing Sheets

US 11,354,440 B1

ANALYZING AND MITIGATING PRIVACY ISSUES ON A COMPUTING DEVICE USING COOKIE GENERATION FLOWS

BACKGROUND

Online user privacy is an important need both for individuals and for institutions. Furthermore, with the adoption of the General Data Protection Regulation (GDPR) in the European Union (EU), there is an increasing need for websites to become compliant with privacy regulations, and to protect users from being tracked without users' knowledge or permission. Some current methods and systems to protect user privacy on the Internet are limited to blacklists. However, a blacklist may only be useful for identifying malware using an already existing database of file hash functions (e.g., MD5s). Thus, a reliable and robust solution to determine and protect user privacy on the Internet and to help webpages become compliant with privacy regulations is needed.

The subject matter claimed herein is not limited to embodiments that solve any disadvantages or that operate only in environments such as those described above; rather, this background is only provided to illustrate one example technology area where some embodiments described herein may be practiced.

SUMMARY

In some embodiments, a computer-implemented method for analyzing and mitigating privacy issues on a computing device using cookie generation flows may be performed by a computing device including one or more processors. The method may include initiating, by the computing device, a headless web browser; monitoring, by the computing device, a request made of a website accessed by the headless web browser; monitoring, by the computing device, scripts created on the website; instrumenting, by the computing device, a function used to create a cookie on the computing device; tracing, by the computing device, an initial generation of a call used to create the cookie on the computing device; obtaining, by the computing device, a cookie generation flow related to the creation of the cookie; and initiating a security action based on obtaining the cookie generation flow.

In some embodiments, initiating the security action may include preventing third-party cookie creation, blocking a third-party cookie, alerting an administrator regarding cookie creation, or disabling the cookie, or a combination thereof.

In some embodiments, attaching the headless web browser may include attaching the headless web browser using a protocol interface. In some embodiments, the headless web browser may be attached using the Chrome Debugging Protocol (CDP).

In some embodiments, monitoring the request may further include detecting a loader; connecting the loader to a frame corresponding with the request; performing analysis on at least one response received in response to the request; identifying an initiator of the request; and connecting the initiator to a source code associated with the initial generation of the call to create the cookie.

In some embodiments, performing the analysis may further include checking a value of different possible headers and document content associated with the response.

In some embodiments, monitoring the scripts may include classifying the scripts according to a technique used to call the scripts; establishing an inclusion context of the scripts; indicating the initiator of the initial generation of the call to create the cookie; and relating the initiator to the source code associated with the initial generation of the call to create the cookie.

In some embodiments, instrumenting the function may further include including the instrumentation in all possible contexts of creation of the cookie. In some embodiments, instrumenting the function may include creating a communication channel between a new implementation of the cookie created and a debugger attached to the headless web browser.

In some embodiments, tracing may further include performing a back trace analysis on the initial generation of the call used to create the cookie; and correlating the back trace analysis to a context of script creation.

In some embodiments, obtaining the cookie generation flow may include obtaining stack trace information from the instrumented function, the scripts created on the website, and the request made; and combining the obtained stack trace information to create a finalized cookie generation flow.

In some embodiments, a computer device may include a processor, a memory in electronic communication with the processor, and instructions stored in the memory, with the instructions being executable by the processor to perform a method for analyzing and mitigating privacy issues on a computing device using cookie generation flow.

In some embodiments, one or more non-transitory computer-readable media may include one or more computer-readable instructions that, when executed by one or more computing devices, cause the one or more computing devices to perform a method for analyzing and mitigating privacy issues on a computing device using cookie generation flow.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Tracking users' personal information and habits on the Internet is becoming more and more common, and is frequently accomplished through the use of cookies, which may be strings of text loaded onto a user's web browser when a user visits a website. A cookie may provide the website information to recognize and remember users, and may include the ability to track each user's search engine queries, the website a user visits, the frequency of a user's return visits to a website, the speed a user scrolls through a webpage, where the user stops scrolling within a webpage, movement of the mouse within a webpage, user comments, user clicks, user entries in forms, how long a user stays a specific location or at a specific website or webpage, etc. However, it may not be clear to users when they are being tracked, how they are being tracked, by whom they are being track, where the data is being sent, and why the data is being collected and sent. Furthermore, websites themselves may not be aware of all tracking of users.

Some current solutions do not take into consideration the diverse factors that are involved in the generation of cookies, and are instead concerned with looking at one side of the problem (e.g., blacklists). In addition, current solutions, such as ghostery and uBlock, only use blacklists to perform the analysis on whether a cookie is troublesome. A blacklist, however, may be easily bypassed by renaming the domain name.

Furthermore, websites may unintentionally create cookies without the websites being aware of the cookies being created or without the websites being aware of the specific reason for the creation of a certain cookie or how the cookie was created. In some cases, the unintentional creation of a cookie may be due to a library the website is loading that was not created by the website developer. For example, once a script is included in the website, the script may generate chains of calls and requests that create multiple unexpected cookies. Thus, a deeper analyzing of the creation of, and presence of, cookies on a website may provide more user protection from intrusive tracking and malicious actions.

Figure 1:
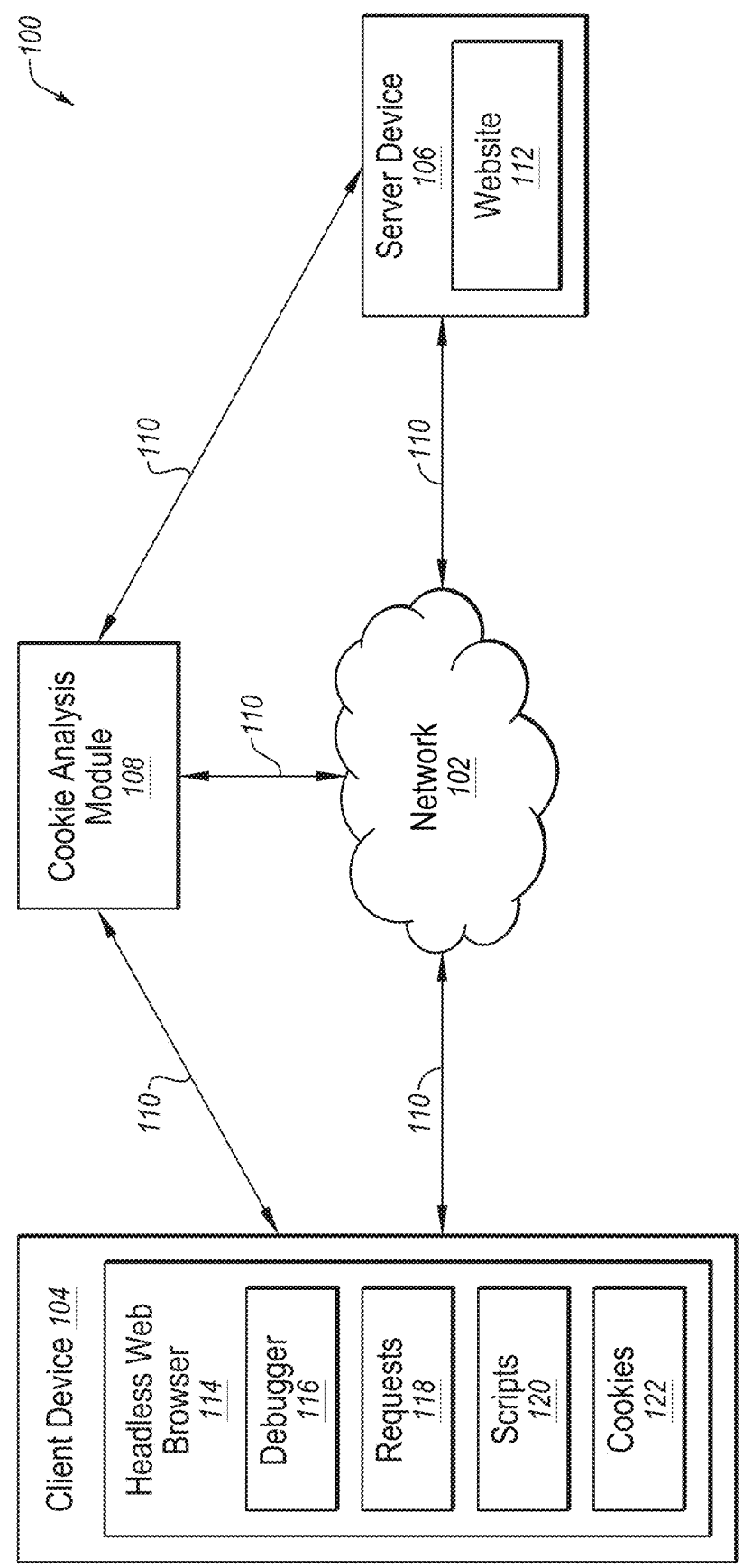
FIG. 1 illustrates an example system configured for analyzing and mitigating privacy issues on a computing device using cookie generation flows.

Turning to the figures, FIG. 1 illustrates an example system configured for analyzing and mitigating privacy issues on a computing device using cookie generation flows. The system 100 may include a network 102, a client device 104, a server device 106, and a cookie analysis module 108. In some embodiments, the cookie analysis module 108 may execute on a standalone device that communicates with the client device 104 and the server device 106. In other embodiments, however, the cookie analysis module 108 may execute on, or be part of, the client device 104 and/or the server device 106.

In some embodiments, the network 102 may be configured to communicatively couple the client device 104, the server device 106, and the cookie analysis module 108 by way of the communication links 110. Although not specifically shown in FIG. 1, the client device 104 may directly communicate with the server device 106 by way of the communication links 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
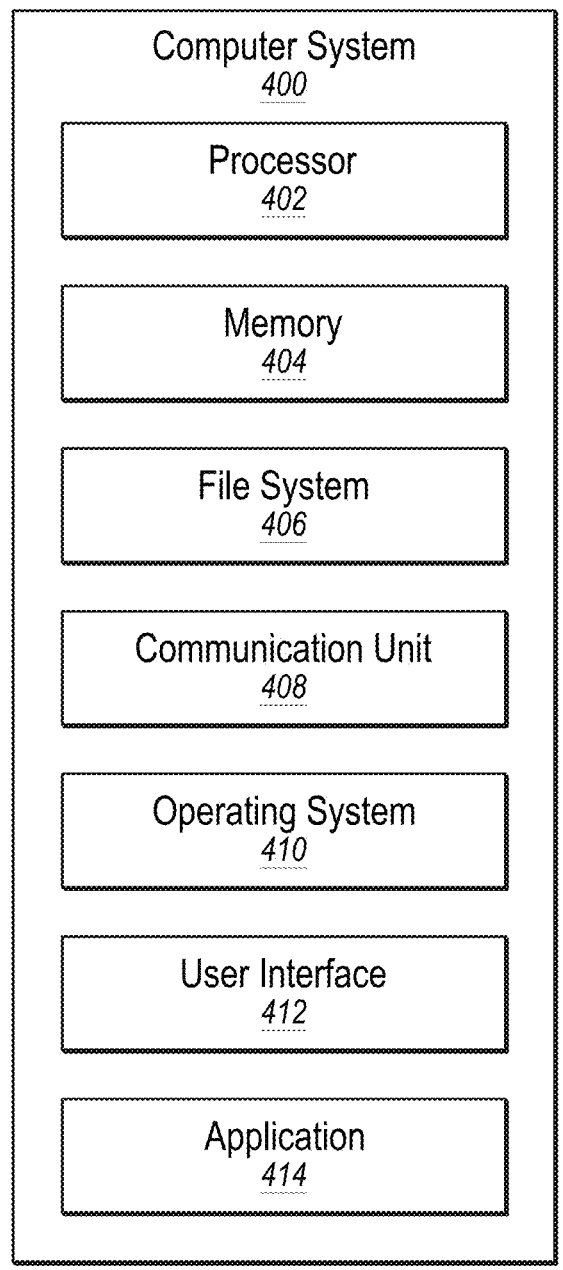
FIG. 4 illustrates an example computer system that may be employed in analyzing and mitigating privacy issues on a computing device using cookie generation flows.

In some embodiments, the client device 104 may be any computer system capable of communicating over the network 102 and capable of at least analyzing cookies and mitigating privacy issues detected from the cookie analysis, examples of which are disclosed herein in connection with the computer system 400 of FIG. 4. Similarly, in some embodiments, the server device 106 may be any computer system capable of communicating over the network 102 and capable of analyzing cookies and mitigating privacy issues detected from the cookie analysis, examples of which are disclosed herein in connection with the computer system 400 of FIG. 4.

In one embodiment, the cookie analysis module 108 may operate to initiate a headless web browser 114 running on the client device 104. The cookie analysis module 108 may further attach a debugger 116 to the headless web browser 114. Further, in one embodiment, the cookie analysis module 108 may monitor a request made of a website 112 hosted on the server device 106 that is accessed by the headless web browser 114. The cookie analysis module 108 may further monitor requests 118 created on the website 112, monitor cookies 122 stored on the client device 104, and instrument a cookie creation function of cookies 122. Each of the headless web browser 114, the debugger 116, the requests 118, the scripts 120, and the cookies 122 are described in further detail with respect to FIG. 2.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the cookie analysis module 108 may execute on the client device 104, on the server device 106, or on another device not illustrated in FIG. 1.

Figure 2:
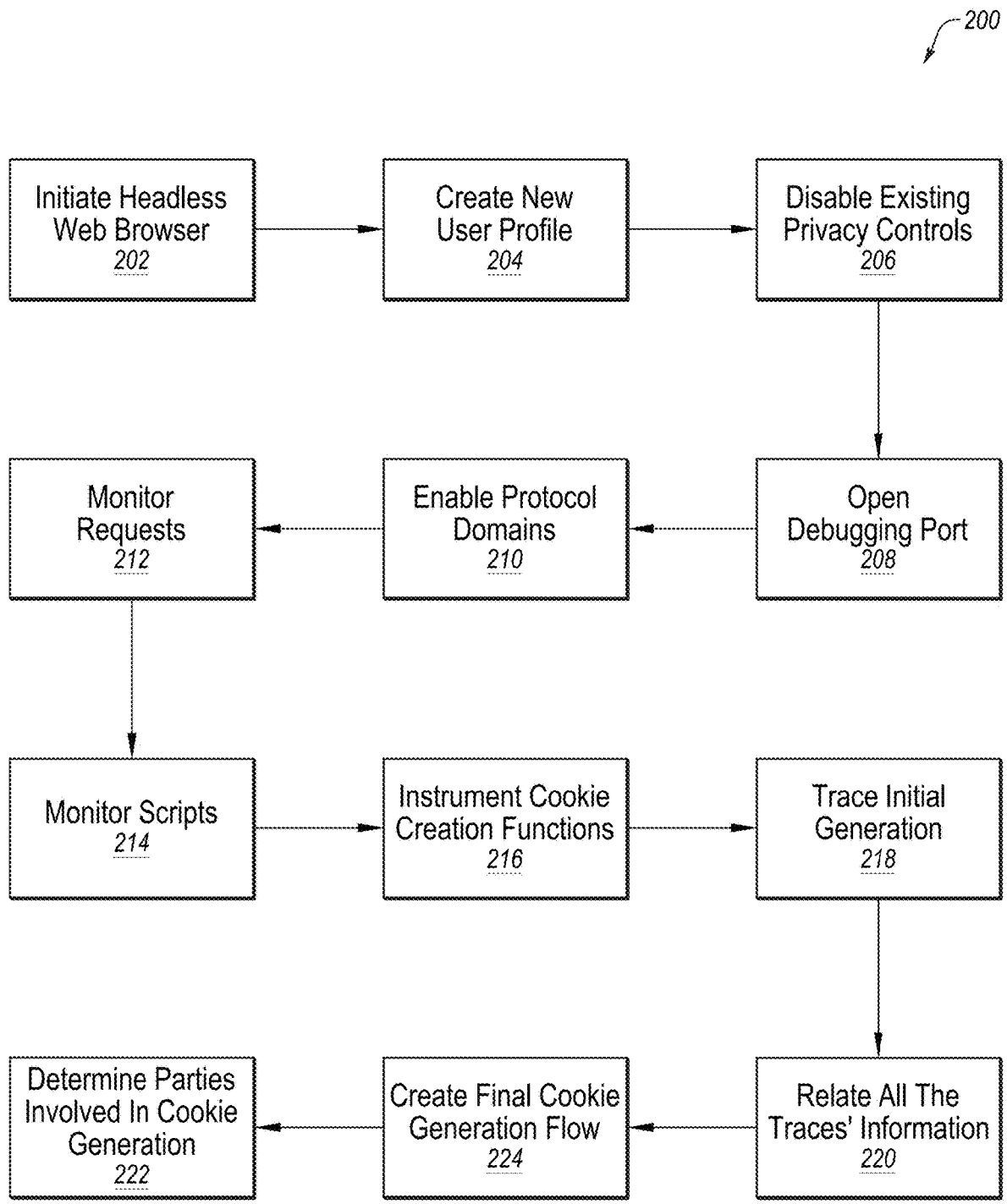
FIG. 2 illustrates an example process flow for analyzing and mitigating privacy issues on a computing device using cookie generation flows.

FIG. 2 illustrates an example flowchart 200 related to analyzing and mitigating privacy issues on a computing device using cookie generation flows. In some embodiments, in order to identify potential security or privacy issues resulting from cookie generation and usage, analysis regarding how a cookie is generated, by whom, and what the cookie contains may be valuable. In addition, analyzing the cookie generation may further result in obtaining information regarding all of the parties involved in the creation of each cookie and the techniques used to create each cookie. By gathering information about all of the parties involved, and by determining the components associated with the cookie generation, more robust actions may be used to control and prevent privacy attacks. In additional or alternative embodiments, the same information gathered about the cookie generation may be used by privacy-conscious websites to have better control over the cookies that are created in the website by other parties, either intentionally or accidentally. Thus, website developers may be better equipped to satisfy privacy regulations (such as those provided by the GDPR).

The following description is provided with respect to the CHROME web browser developed by GOOGLE, LLC, and thus, in some embodiments, the description is made in reference to source code available from the open-source project CHROMIUM provided by GOOGLE, LLC. However, it is to be understood that the descriptions provided are not limited solely to the CHROME web browser or to the CHROMIUM source code, and that the methods and systems provided may be used and implemented on, or with, any available web browser using any suitable code.

With reference to both FIG. 1 and FIG. 2, at action 202, the cookie analysis module 108 may initiate a headless web browser. In one embodiment, the headless web browser may provide automated control of a website in an environment similar to that of an existing web browser, but where functions are executed by way of command-line interfaces or by way of network communications. Further, in one embodiment, initiation of the headless web browser may enable the cookie analysis module 108 to analyze a specified domain, as well as corresponding cookies that are generated in the website. In an additional or alternative embodiment, the cookie analysis module 108 may determine the resources created by the website.

At action 204, the cookie analysis module 108 may create a new user profile for the initiated headless web browser instance of action 202. The newly created user profile may be created in order to avoid any possible bias created from previous accesses to the headless web browser instance and to create a clean profile. Thus, at action 204, any existing cookies may be deleted and any local and/or session storage data may be deleted. In one example embodiment, the new user profile may be created using the CHROMIUM function "user-data-dir" in order to avoid any possible bias created from previous accesses, and thus create a clean profile. In an additional or alternative embodiment, "user-data-dir" may be any user data directory function that creates a directory containing profile data including history, bookmarks, and cookies, as well as pre-installation local states.

At action 206, the cookie analysis module 108 may disable any existing security and/or privacy controls associated with the browser that may tamper with the cookie generation flow creation being performed. In one example embodiment, disabling existing security and/or privacy controls may include site isolation by providing that webpages from different websites are always placed into different processes, with each process running in a sandbox that limits what the process is allowed to do. In addition, the site isolation may block each process from receiving certain types of sensitive data from other webpages and/or websites.

At action 208, the cookie analysis module 108 may open a debugging port. The debugging port may be opened in order to remotely control the browser and in order to remotely inspect the webpage being analyzed. Thus, the cookie analysis module 108 may attach the debugger to a debugging protocol interface, and then subsequently hide the headless nature of the web browser instance. For example, the cookie analysis module 108 may unmask the WebGL vendor value and return a non-zero dimension in the case that an image fails to load.

At action 210, the cookie analysis module 108 may enable protocol domains. The cookie analysis module 108 may thus start a navigation to the intended website under inspection using a protocol domain (e.g., "page" and the "navigate" function) by indicating the target website. For example, enabling protocol domains may act to control aspects of the website and launch related listeners to obtain information when certain events are detected. Launching listeners may enable the target domain to listen on multiple ports and internet protocol (IP) addresses by adding a listener bound to the target IP address and port. In one example, listening for and detecting certain events may be determined through the functions "targetInfoChanged" or "executionContext Create." In one example, functions such as "targetInfoChanged" may enable a protocol event on every target website change.

At action 212, the cookie analysis module 108 may monitor requests that occur after the headless web browser has navigated to the target website. For example, monitoring the requests may be done through the use of example CHROMIUM functions such as "request WillBeSent" and "responseReceived." The cookie analysis module 108 may further monitor requests by establishing a loader of the request and connecting a loader identification to the corresponding domain frame (e.g., using "loaderID"). Requests may include, but are not limited to requests related to HyperText Markup Language (HTML) files, stylesheets, images, videos, scripts, and the like.

The cookie analysis module 108 may then perform an analysis on responses received. Performing the analysis may include checking the value of different possible headers associated with each request, where each possible header may provide information about a cookie associated with the webpage. In one example embodiment, the cookie analysis module may use functions such as "set-cookie" and "content-type." For example, the function "set-cookie" may be a HyperText Transfer Protocol (HTTP) response header that sends cookies from the server to the user. In another example, the function "content-type" may be an entity header used to indicate a media type of the header, and used to tell the client device 104 what type of content is actually returned by the request. Analysis on the responses received may include identifying the initiator of the request and connect the initiator of the request to the initiator's source code, including indications as to the line number and the column number where the request is made.

In addition, at action 212, the cookie analysis module 108 may determine which frame is the source of the call by establishing an inclusion context of the script. In one embodiment, establishing the inclusion context of the script may be accomplished by way of "executionContextAuxData." Content scripts may be files run in the context of each webpage. By using a document object module (DOM), a content script may read details of a webpage the web browser visits, make changes to the webpage, and pass information to the webpage's parent extension.

Furthermore, at action 212, the cookie analysis module 108 may identify the initiator of the cookie creation call, and relate the initiator to the source code. In some embodiments, relating the initiator to the source code may include specifying the line and column number of the origin.

At action 214, the cookie analysis module 108 may monitor the scripts created on the target website, where each script that is created is made identifiable for later processing and analysis. In one embodiment, the example "runtime" protocol domain and "ScriptID" type may be used in making the scripts identifiable. Subsequently, the cookie analysis module 108 may classify each script according to the technique used to call the script. Call information may be obtained from sources such as "url" and "StartLine."

At action 216, the cookie analysis module 108 may instrument the cookie creation functions determined to be used to create the cookies by the identified initiators. In example embodiments, the cookie analysis module 108 may use a protocol domain, such as the "Page" protocol domain. The cookie analysis module 108 may then control the functions related to the creation of the cookies. In some example embodiments, the cookie analysis module 108 may edit the cookies, protect the cookies (e.g., make the cookies read only), block the cookies, export the cookies, etc. Furthermore, the cookie analysis module 108 may create a communication channel between the new implementations introduced by the cookie analysis module 108 and the debugger associated with the headless web browser (e.g., using the Chrome DevToolsProtocol).

At action 218, the cookie analysis module 108 may then trace the initial generation of the cookie creation call, including, for example, using a "StackTrace" analysis in the instrumentation of the function using the "Page" protocol domain. Tracing the initial generation may include determining the context of the cookie creation call by performing a backtrace until the origin is determined, and then correlating the origin to the specific "FrameID" present in the website. The cookie analysis module 108 may then build a full stack, indicating each of the different steps taken from invocation at the origin point until the final creation of the cookie. At this point, the cookie analysis module 108 may control all involved scripts and domains, and may inspect both the file name and the function name (e.g., "fileName" and "functionName").

At action 220, the cookie analysis module 108 may relate all of the traces information by obtaining the cookie generation flow, processing the flow, and then saving the associated information with the debugger (e.g., using Chrome's DevToolsProtocol). In one example embodiment, the cookie analysis module 108 may use the functions "WriteFile" or "appendFile" depending on storing requirements of the debugger. All "stackTrace" information obtained by instrumented functions with monitored requests may then be obtained, as well as the data related to the cookie creation in each of the frames of the website.

At action 222, the cookie analysis module 108 may connect the "requestIDs" generated and different "ScriptIDs" in order to determine each of the parties involved in the cookie generation flow.

At action 224, the cookie analysis module 108 may combine all of the information obtained in order to create the final cookie generation flow, and the final cookie generation flow may then be stored for later action or analysis.

In some embodiments, once the cookie generation information is determined, including information regarding all of the parties involved in the cookie generation, the cookies may be controlled by the cookie analysis module 108. In some embodiments, cookies used to identify a user and the user's authenticated session may be stolen in a way that leads to hijacking the authenticated user's session. Thus, security actions may be implemented using the cookie analysis module 108 by preventing access to the cookie and/or using exfiltration actions. Furthermore, identifying information about the cookie generation flow as described above may be useful in identifying and tracing information about the third-party creators of the cookies, resulting in blocking specified third-party cookies, altering an administrator or the user about specific third-party cookies, etc. In addition, a security action may include disabling a cookie identified to be a potential security issue.

In an additional or alternative embodiment, once information regarding the cookie generation, including the parties involved in the cookie generation, is determined, then changes may be implemented with regard to the website in order to the make the website compliant with regulations (e.g., GDPR).

Figure 3:
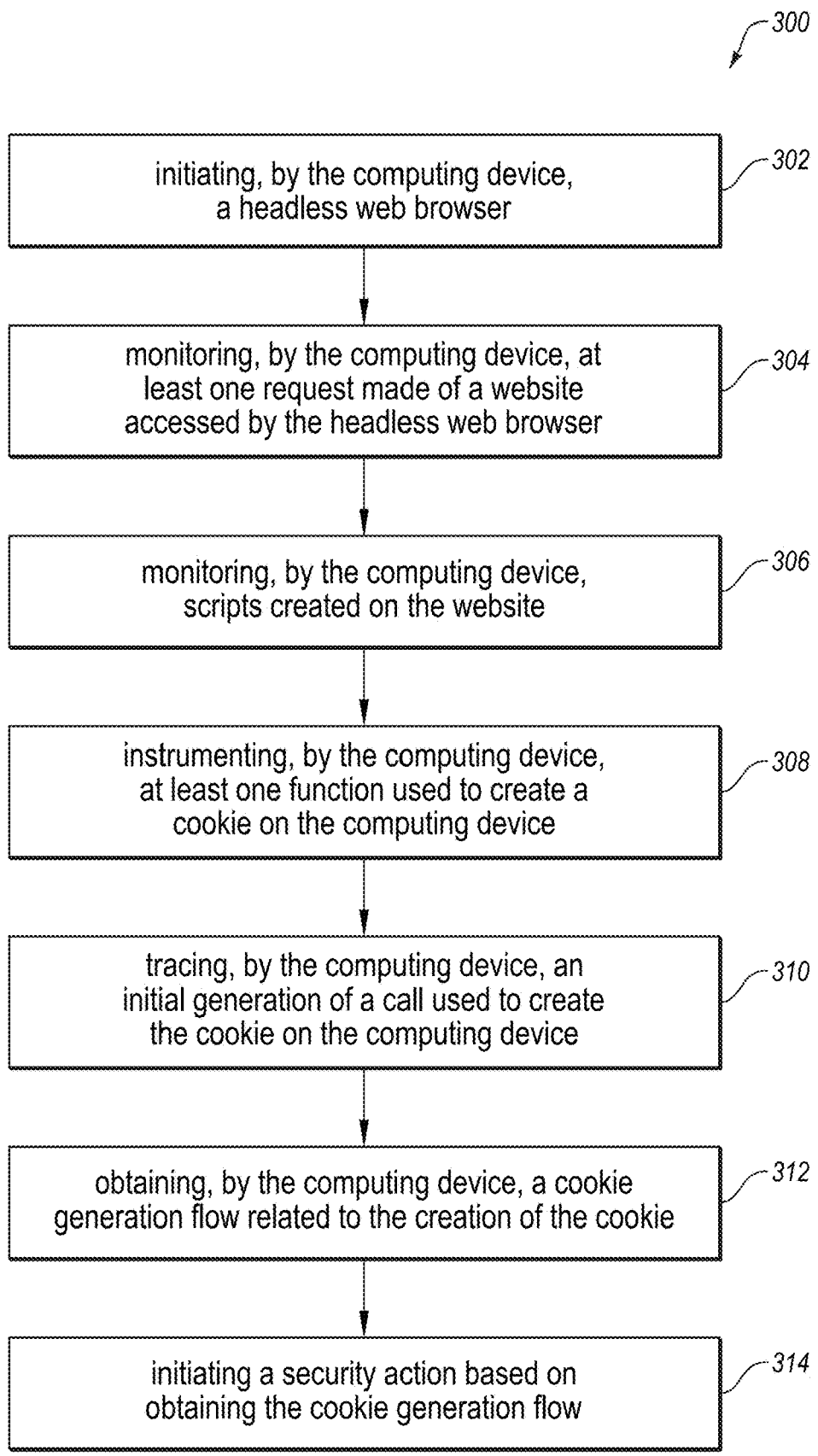
FIG. 3 illustrates a flowchart of an example method for analyzing and mitigating privacy issues on a computing device using cookie generation flows.

FIG. 3 is flowchart of an example method 300 for analyzing and mitigating privacy issues on a computing device using cookie generation flows. The method 300 may be performed, in some embodiments, by a device, module, and/or system, such as by the client device 104, the server device 106 and/or the cookie analysis module 108 executing on one of these devices or on another device. In these and other embodiments, the method 300 may be performed by one or more processors based on one or more computer-readable instructions stored on one or more non-transitory computer-readable media. The method 300 will now be described in connection with FIGS. 1, 2, and 3.

At action 302, the method may include initiating, by the computing device, a headless web browser. For example, the cookie analysis module 108 may operate to initiate a headless web browser 114 running on the client device 104 in order to gain automated control of website 112.

At action 304, the method may include monitoring, by the computing device, a request made of a website accessed by the headless web browser. For example, the cookie analysis module 108 may monitor requests that occur after the headless web browser 114 has navigated to a target website (e.g., such as website 112).

At action 306, the method may include monitoring, by the computing device, scripts created on the website. For example, the cookie analysis module 108 may monitor each of the requests 118 created on website 112, such that each of the requests 118 are made identifiable for later processing and analysis. In addition, the cookie analysis module 108 may classify each script according to the technique used to call the script.

At action 308, the method may include instrumenting, by the computing device, a function used to create a cookie on the computing device. For example, the cookie analysis module 108 may instrument the functions determined to be used to create the cookies by the identified initiators. In some example, embodiments, the cookie analysis module 108 may use a protocol domain to instrument the functions.

At action 310, the method may include tracing, by the computing device, an initial generation of a call used to create the cookie on the computing device. For example, the cookie analysis module 108 may then trace the initial generation of the cookie creation call, including, for example, using a "StackTrace" analysis in the instrumentation of the function using the "Page" protocol domain. Tracing the initial generation may include determining the context of the cookie creation call by performing a backtrace until the origin is determined, and then correlating the origin to the specific "FrameID" present in the website.

At action 312, the method may include obtaining, by the computing device, a cookie generation flow related to the creation of the cookie. For example, the cookie analysis module 108 may then obtain the cookie generation flow, process the flow, and then save the associated information with the debugger (e.g., using Chrome's DevToolsProtocol).

At action 314, the method may include initiating a security action based on obtaining the cookie generation flow. For example, the cookie analysis module 108 may implement a security action such as quarantining a machine, software, or a process; blacklisting a file or a function; blocking network connectivity, etc. Although the actions of the method 300 are illustrated in FIG. 3 as discrete actions, various actions may be divided into additional actions, combined into fewer actions, reordered, expanded, or eliminated, depending on the desired implementation.

The method 300 may provide a plurality of benefits and technological improvements, and may result in the practical application of analyzing cookies based on their content and generation flows, as opposed to simply using blacklists or heuristics. Furthermore, the method 300 described herein may provide the technological improvement of determining all parties involved in the creation of each cookie on a website and the techniques used to create each cookie. With this information, the created cookies may be better controlled and any privacy issues caused by the cookies may be mitigated. Furthermore, controlling the cookies may aid in the practical application of making websites and webpage compliant with regulations.

Also, the method 300 may improve the technological field of personal and business privacy and security by targeting a specific type of attack, and stopping the attack before the attack occurs or preventing the attack from causing further damage. A security action may be implemented automatically, without input from a human administrator, to mitigate, eliminate, or otherwise stop a malicious attack. For example, a security action may include quarantining a machine, software, or a process; blacklisting a file or a function; blocking network connectivity, etc. Privacy may be an important aspect for both individuals and institutions, and the method 300 may provide an advanced and reliable method for analyzing web privacy and aiding websites and webpages in becoming compliant with regulations.

FIG. 4 illustrates an example computer system that may be employed in analyzing and mitigating privacy issues on a computing device using cookie generation flows. In some embodiments, the computer system 400 may be part of any of the systems or devices described in this disclosure. For example, the computer system 400 may be part of any of the client device 104, the server device 106, and/or the cookie analysis module 108 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more modules, such as the cookie analysis module 108 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as the cookie analysis module 108 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for analyzing and mitigating privacy issues on a computing device using cookie generation flow, at least a portion of the method being performed by the computing device comprising one or more processors, the method comprising:
   initiating, by the computing device, a headless web browser;
   monitoring, by the computing device, a request made of a website accessed by the headless web browser;
   monitoring, by the computing device, scripts created on the website;
   instrumenting, by the computing device, a function used to create a cookie on the computing device;
   tracing, by the computing device, an initial generation of a call used to create the cookie on the computing device by performing a back trace analysis on the initial generation of the call used to create the cookie in order to identify an origin of the call and correlating the origin of the call to a FrameID present in the website;
   obtaining, by the computing device, a cookie generation flow related to creating the cookie; and
   initiating a security action based on obtaining the cookie generation flow.

2. The method of claim 1, wherein the initiating of the security action further comprises:
   alerting an administrator regarding cookie creation, or disabling the cookie, or a combination thereof.

3. The method of claim 1, wherein the initiating of the headless web browser further comprises:
   attaching the headless web browser using a protocol interface.

4. The method of claim 3, wherein the attaching of the headless web browser using the protocol interface further comprises:

attaching the headless web browser using the Chrome Debugging Protocol (CDP).

5. The method of claim 1, wherein the monitoring of the request further comprises:
   detecting a loader;
   connecting the loader to a frame corresponding with the request;
   performing analysis on at least one response received in response to the request;
   identifying an initiator of the request; and
   connecting the initiator to a source code associated with the initial generation of the call to create the cookie.

6. The method of claim 5, wherein the performing of the analysis further comprises:
   checking a value of different possible headers and document content associated with the response.

7. The method of claim 5, wherein the monitoring of the scripts further comprises:
   classifying the scripts according to a technique used to call the scripts;
   establishing an inclusion context of the scripts;
   indicating the initiator of the initial generation of the call to create the cookie; and
   relating the initiator to the source code associated with the initial generation of the call to create the cookie.

8. The method of claim 1, wherein the instrumenting of the function further comprises:
   including the instrumenting in all possible contexts of creation of the cookie.

9. The method of claim 1, wherein the instrumenting of the function further comprises:
   creating a communication channel between a new implementation of the cookie created and a debugger attached to the headless web browser.

10. The method of claim 1, wherein the obtaining of the cookie generation flow further comprises:
    obtaining stack trace information from the instrumented function, the scripts created on the website, and the request made; and
    combining the obtained stack trace information to create a finalized cookie generation flow.

11. A computing device for analyzing and mitigating privacy issues on the computing device using cookie generation flows; comprising:
    a processor;
    a memory in electronic communication with the processor; and
    instructions stored in the memory, the instructions being executable by the processor to:
    initiate a headless web browser;
    monitor a request made of a website accessed by the headless web browser;
    monitor scripts created on the website;
    instrument a function used to create a cookie on the computing device;
    trace an initial generation of a call used to create the cookie on the computing device by performing a back trace analysis on the initial generation of the call used to create the cookie in order to identify an origin of the call and correlating the origin of the call to a FrameID present in the website;
    obtain a cookie generation flow related to creating the cookie; and
    initiate a security action based on obtaining the cookie generation flow.

12. The computing device of claim 11, wherein when the processor attaches the headless web browser, the instructions are further executable to:
    attach the headless web browser using a protocol interface.

13. The computing device of claim 12, wherein when the processor attaches the headless web browser using the protocol interface, the instructions are further executable to:
    attach the headless web browser using the Chrome Debugging Protocol (CDP).

14. The computing device of claim 11, wherein when the processor monitors the request, the instructions are further executable to:
    detect a loader;
    connect the loader to a frame corresponding with the request;
    perform analysis on a response received in response to the request;
    identify an initiator of the request; and
    connect the initiator to a source code associated with the initial generation of the call to create the cookie.

15. The computing device of claim 14, wherein when the processor performs the analysis, the instructions are further executable to:
    check a value of different possible headers and document content associated with the response.

16. The computing device of claim 14, wherein when the processor monitors the scripts, the instructions are further executable to:
    classify the scripts according to a technique used to call the scripts;
    establish an inclusion context of the scripts;
    indicate the initiator of the initial generation of the call to create the cookie; and
    relate the initiator to the source code associated with the initial generation of the call to create the cookie.

17. The computing device of claim 11, wherein when the processor instruments the function, the instructions are further executable to:
    include the instrumenting in all possible contexts of creation of the cookie.

18. The computing device of claim 11, wherein when the processor instruments the function, the instructions are further executable to:
    create a communication channel between a new implementation of the cookie created and a debugger attached to the headless web browser.

19. One or more non-transitory computer-readable media comprising one or more computer readable instructions that, when executed by one or more processors of a computing device, cause the computing device to perform a method for analyzing and mitigating privacy issues on the computing device using cookie generation flows, the method comprising:
    initiating, by the computing device, a headless web browser;
    monitoring, by the computing device, a request made of a website accessed by the headless web browser;
    monitoring, by the computing device, scripts created on the website;
    instrumenting, by the computing device, a function used to create a cookie on the computing device;
    tracing, by the computing device, an initial generation of a call used to create the cookie on the computing device by performing a back trace analysis on the initial generation of the call used to create the cookie in order to identify an origin of the call and correlating the origin of the call to a FrameID present in the website;

obtaining, by the computing device, a cookie generation flow related to creating the cookie; and initiating a security action based on obtaining the cookie generation flow.

20. The method of claim 1, wherein the initiating of the security action further comprises:

preventing third-party cookie creation or blocking a third-party cookie.

* * * * *